United States Patent

Yamada

(10) Patent No.: US 9,446,780 B2
(45) Date of Patent: Sep. 20, 2016

(54) STEERING APPARATUS

(71) Applicant: NSK Ltd., Tokyo (JP)

(72) Inventor: Jun Yamada, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/654,496

(22) PCT Filed: Jan. 30, 2015

(86) PCT No.: PCT/JP2015/052673
§ 371 (c)(1),
(2) Date: Jun. 19, 2015

(87) PCT Pub. No.: WO2016/013235
PCT Pub. Date: Jan. 28, 2016

(65) Prior Publication Data
US 2016/0107675 A1    Apr. 21, 2016

(30) Foreign Application Priority Data

Jul. 25, 2014  (JP) ................................ 2014-151916
Jul. 25, 2014  (JP) ................................ 2014-151917

(51) Int. Cl.
*B62D 1/184* (2006.01)
*B62D 1/187* (2006.01)
(52) U.S. Cl.
CPC .............. *B62D 1/184* (2013.01); *B62D 1/187* (2013.01)
(58) Field of Classification Search
CPC ................................ B62D 1/184; B62D 1/187
See application file for complete search history.

(56) References Cited

U.S. PATENT DOCUMENTS

| 2003/0172765 A1* | 9/2003 | Heiml ................ | B62D 1/184 74/493 |
| 2012/0266715 A1* | 10/2012 | Okada ................ | B62D 1/187 74/493 |
| 2012/0272778 A1* | 11/2012 | Okada ................ | B62D 1/184 74/493 |

(Continued)

FOREIGN PATENT DOCUMENTS

| EP | 1795425 A2 | 6/2006 |
| JP | 2009-090894 A | 4/2009 |
| WO | WO 2012/035967 | 3/2012 |

OTHER PUBLICATIONS

Written Opinion of the International Search Authority for Int'l Application No. PCT/JP2015/052673, mailed Apr. 21, 2015, with English Translation, 6 pages total.

*Primary Examiner* — Ruth Ilan
(74) *Attorney, Agent, or Firm* — Squire Patton Boggs (US) LLP

(57) ABSTRACT

A steering apparatus capable of easily and sufficiently mitigating rattles and rattling sounds during a positional adjustment of a steering wheel without affecting the operability of a pivot lever is provided.
A steering apparatus 1 can move a column 20 that holds a shaft of a steering wheel H with respect to a vehicle body to adjust a tilt position and a telescopic position of the steering wheel H. The steering apparatus 1 includes: a pivot lever 123 for unclamping and unclamping the column 20 with respect to the vehicle body; a movable cam 121 and a fixed cam 120 that clamp and unclamp the column 20 by changing a turn of the pivot lever 123 into an axial movement of said turn; a sleeve 122 that holds the movable cam 121 and slides against the movable cam 121 when the pivot lever 123 is turned; and a ring spring 125 that presses the sleeve 122 against the sliding surface of the movable cam 121.

13 Claims, 15 Drawing Sheets

(56) References Cited

U.S. PATENT DOCUMENTS

| | | | | |
|---|---|---|---|---|
| 2014/0373663 A1* | 12/2014 | Hahn | ............... | B62D 1/184 74/493 |
| 2015/0027263 A1* | 1/2015 | Kern | ............... | B62D 1/187 74/495 |
| 2015/0203145 A1* | 7/2015 | Sugiura | ............... | B62D 1/189 74/493 |
| 2015/0360712 A1* | 12/2015 | Baumeister | ............ | B62D 1/184 403/53 |
| 2016/0101806 A1* | 4/2016 | Okada | ............... | F16D 41/064 74/493 |

* cited by examiner

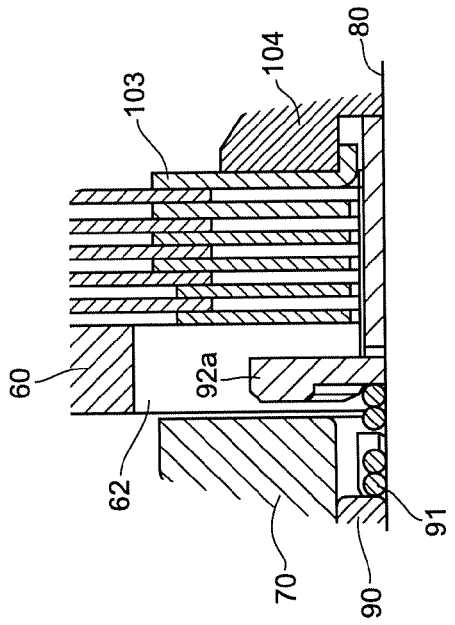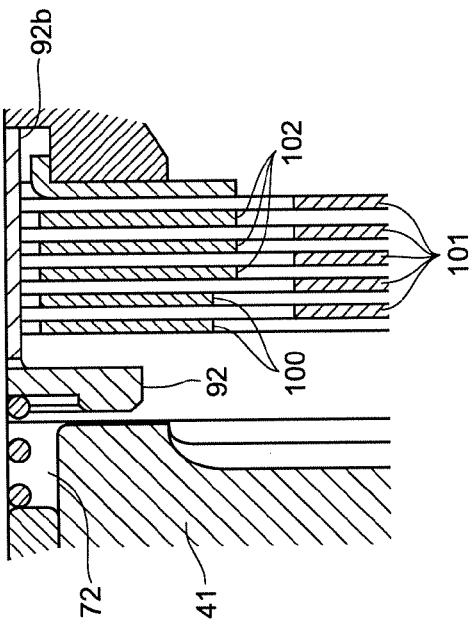
FIG. 5A
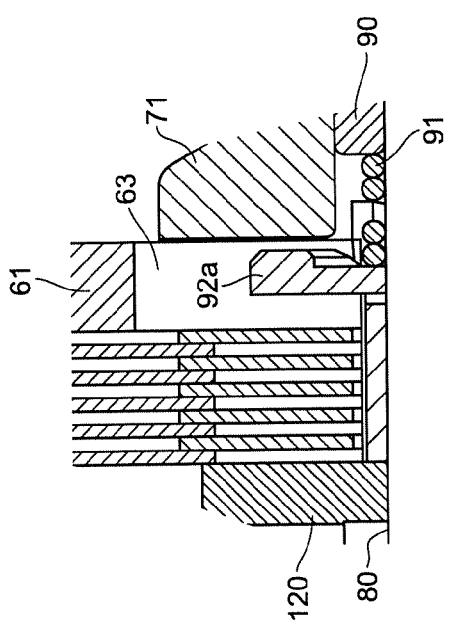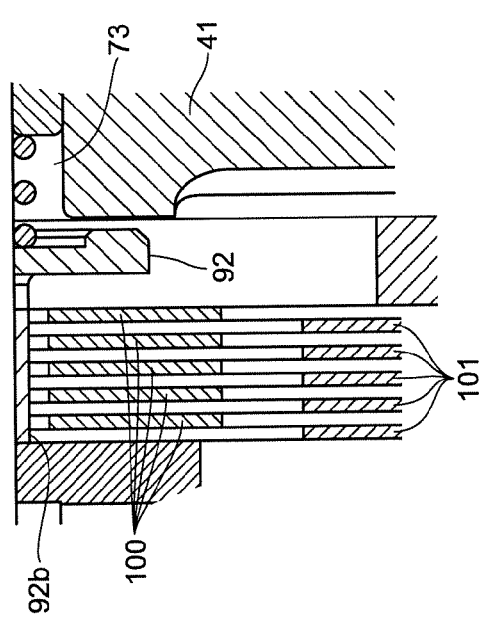
FIG. 5B

STEERING APPARATUS

TECHNICAL FIELD

The present invention relates to a steering apparatus.

BACKGROUND ART

Some vehicle steering apparatuses include a mechanism for adjusting tilt positions and telescopic positions of a steering wheel by moving a column that holds a shaft of the steering wheel with respect to a vehicle body.

In general, the positional adjustment mechanism as described above turns a lever arranged near the steering wheel to clamp or unclamp the column. Such positional adjustment mechanism may cause rattles or rattling sounds since mechanical transmission mechanisms such as cams are used to clamp or unclamp the column.

Patent Document 1, for example, discloses a technique of mitigating rattles or rattling sounds when the lever is tightened or released by projecting a flexible tab from a fixed cam and generating a friction force between the flexible tab and the movable cam.

PRIOR ART DOCUMENT

Patent Document

Patent Document 1: EP1795425

SUMMARY OF THE INVENTION

Problem to be Solved by the Invention

However, with the technique as described above, the movable cam needs to be pressed against the flexible tab with a large load and it is difficult to sufficiently mitigate the rattles and the rattling sounds. The flexible tab may block the movement of the cam and thus affect the operability of the lever.

The present invention has been made in light of the above, and an object of the invention is to provide a steering apparatus that can easily and sufficiently mitigate rattles and rattling sounds when the position of the steering wheel is adjusted without affecting the operability of the lever.

Means for Solving the Problem

An aspect of the present invention in order to achieve the above-mentioned purpose includes a steering apparatus that is capable of adjusting a position of a steering wheel by moving a column that holds a shaft of the steering wheel with respect to a vehicle body, the steering apparatus comprising: a pivot lever for clamping and unclamping the column with respect to the vehicle body; a cam that clamps and unclamps the column by changing a turn of the pivot lever into an axial movement of said turn; a sleeve that holds the cam and slides against the cam when the pivot lever is turned; and a rattle mitigating member that increases at least any one of the friction forces from among a friction force generated between the sleeve and a sliding surface of the cam or a friction force generated between the sleeve and the pivot lever.

Another aspect of the present invention includes a steering apparatus that is capable of adjusting a position of a steering wheel by moving a column that holds a shaft of the steering wheel with respect to a vehicle body, the steering apparatus comprising: a pivot lever for clamping and unclamping the column with respect to the vehicle body; a cam that clamps and unclamps the column by changing a turn of the pivot lever into an axial movement of said turn; a sleeve that holds the cam and slides against the cam when the pivot lever is turned; and a pressing member that presses the sleeve against a sliding surface of the cam.

According to the above-mentioned configuration, the friction force that acts on the sliding surface between the sleeve and the cam can be increased by the pressing member, and thus, rattles and rattling sounds during the positional adjustment of the steering wheel can be easily and sufficiently mitigated without affecting the operability of the lever.

In the steering apparatus, the cam may include a movable cam that rotates together with the pivot lever and a fixed cam that moves in the axial direction due to a rotation of the movable cam, the sleeve may slide against the movable cam, and the pressing member may press the sleeve against the sliding surface of the movable cam.

The sleeve may be formed in an annular shape that receives the movable cam at an inner side, and the pressing member may be attached to an outer peripheral surface of the sleeve.

Grease may be applied to the sliding surface between the sleeve and the cam. The sleeve may be provided with a sliding part that slides against the pivot lever or an intervening member intervened between the pivot lever and the sleeve. The pivot lever or the intervening member may have a disk-shaped part, and the sliding part may have an arc-shaped groove in which the disk-shaped part is fitted therein. The grease may be applied to the sliding part. The pressing member may be an elastic member.

Another aspect of the present invention includes a steering apparatus that is capable of adjusting a position of a steering wheel by moving a column that holds a shaft of the steering wheel with respect to a vehicle body, the steering apparatus comprising: a pivot lever for clamping and unclamping the column with respect to the vehicle body; a cam that clamps and unclamps the column by changing a turn of the pivot lever into an axial movement of said turn; and a sleeve that holds the cam and slides against the cam when the pivot lever is turned, wherein the sleeve includes a sliding part that slides while a part of the pivot lever or an intervening member intervened between the pivot lever and the sleeve is fitted therein, and wherein the sliding part is attached with a gripping member that increases a friction force between the sliding part and the pivot lever or the intervening member by pinching the sliding part from the outer side.

According to the above-mentioned configuration, the friction force between the sliding part of the sleeve and the pivot lever or the intervening member can be increased by the gripping member, and thus, rattles and rattling sounds during the positional adjustment of the steering wheel can be easily and sufficiently mitigated without affecting the operability of the lever.

In the steering apparatus, the pivot lever or the intervening member may have a disk-shaped part, and the sliding part may be formed in an arc shape along a circumferential direction of the disk-shaped part. Grease may be applied to the inside of the sliding part.

The gripping member may be an elastic member.

Effect of the Invention

According to the present invention, rattles and rattling sounds during a positional adjustment of a steering wheel can be easily and sufficiently mitigated without affecting the operability of the lever.

BRIEF DESCRIPTION OF THE DRAWINGS

FIG. 5A is a longitudinal sectional explanatory view showing an inner sleeve peripheral structure at the pivot lever side.

FIG. 5B is a longitudinal sectional explanatory view showing an inner sleeve peripheral structure at the pressing plate side.

MODE FOR CARRYING OUT THE INVENTION

Figure 1:
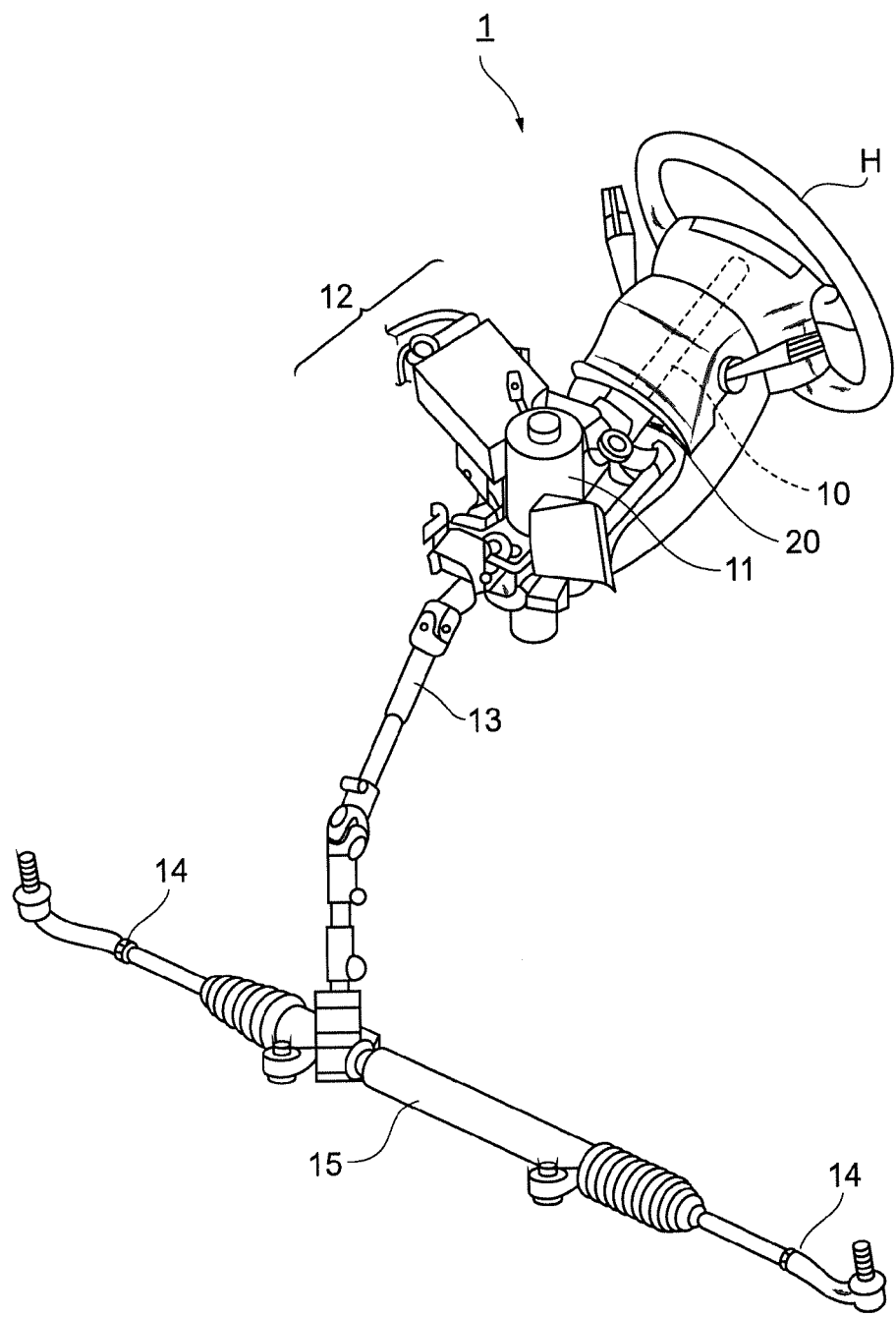
FIG. 1 is a schematic view of a configuration of a steering apparatus.

The embodiments of the present invention will be described below with reference to the attached drawings. Unless specifically noted, positional relationships in the drawing, such as top, down, left and right, are based on the positional relationships shown in the drawing. The dimensional ratio of the drawing is not limited to the ratio shown in the drawing. Furthermore, the embodiments described below are examples for explaining the present invention and are not intended to limit the present invention only to those embodiments. Various modifications may be made to the present invention without departing from the scope of the invention.

A. First Embodiment

FIG. 1 shows an example of an overall configuration of a steering apparatus 1 according to the first embodiment.

The steering apparatus 1 comprises: a rotational axis 10 consisting of, for example, a steering shaft that transmits a steering torque applied by a steering wheel H; a power-assisted mechanism 12 for imparting an auxiliary steering torque to the rotational axis 10 by an electric motor 11; an intermediate shaft 13 connected to an output side of the rotational axis 10 imparted with the auxiliary steering torque; a tie rod 14 that steers a wheel; a rack-and-pinion steering gear 15 that transmits a steering force of the intermediate shaft 13 to the tie rod 14; and the like.

When a driver rotates the steering wheel H, its rotary force is transmitted to the rotational axis 10 and the intermediate shaft 13 and is further transmitted to the tie rod 14 via a steering gear 15 to change the steering angle of the wheel.

The power-assisted mechanism 12 can drive the electric motor 11 in accordance with the steering torque imparted to the rotational axis 10 by the driver so as to impart an auxiliary steering torque to the rotational axis 10.

The steering apparatus 1 according to the present embodiment is capable of adjusting a tilt position (vertical position) and a telescopic position (front/back position) of a steering wheel H by moving a column 20 that holds the rotational axis (shaft) 10 of the steering wheel H with respect to a vehicle body. A mechanism for adjusting the tilt position and the telescopic position in the steering apparatus 1 will be described below.

Figure 2:
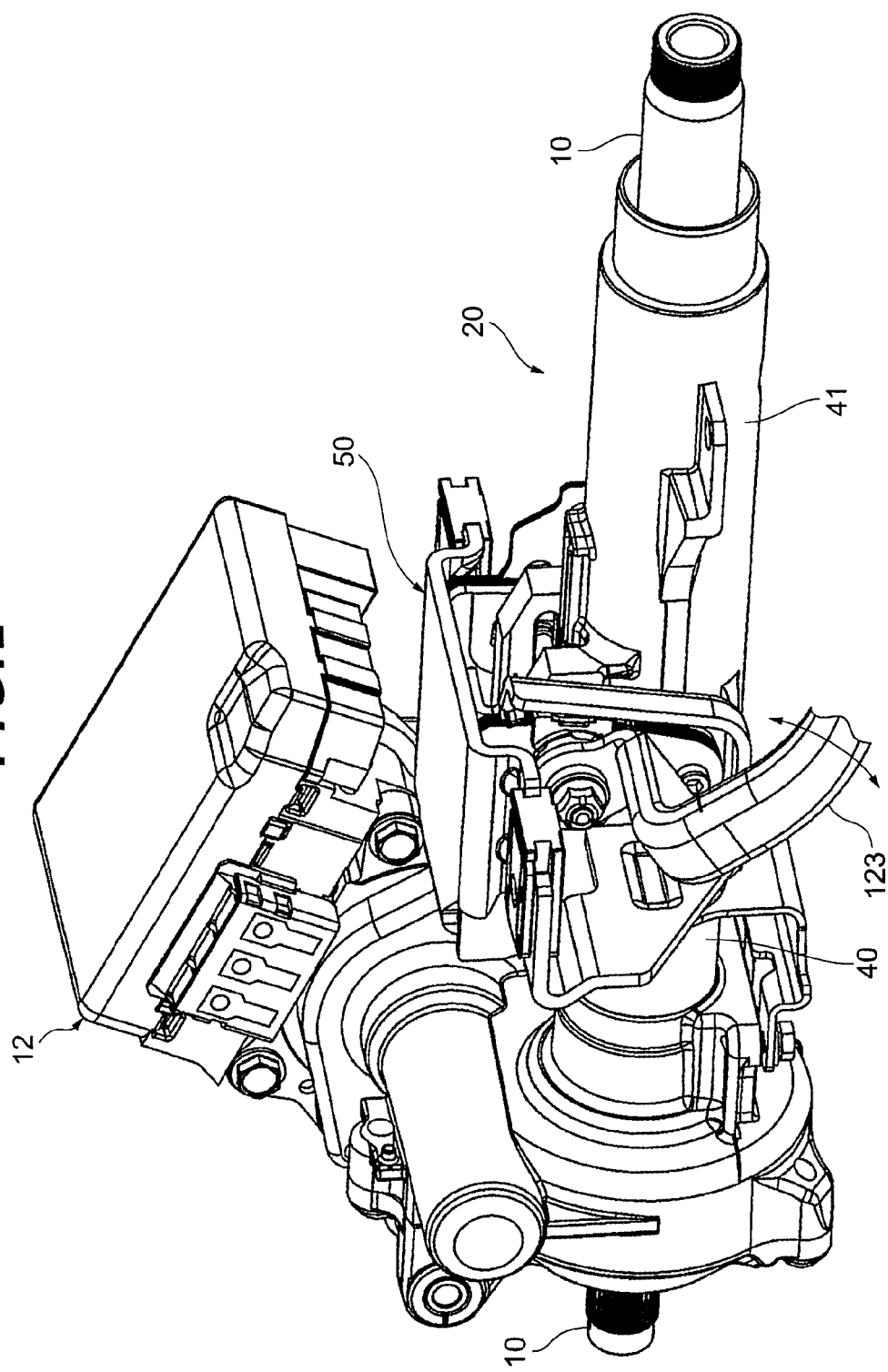
FIG. 2 is a perspective view showing a column peripheral structure of the steering apparatus.

As shown in FIG. 2, for example, the column 20 of the steering apparatus 1 comprises: a cylindrical lower column (inner column) 40 that internally and rotatably supports the rotational axis 10 at the intermediate shaft 13 side (lower steering shaft); and a cylindrical upper column (outer column) 41 that internally and rotatably supports the rotational axis 10 at the steering wheel H side (upper steering shaft).

The upper column 41 is slidably fitted in the outer periphery of the lower column 40 in an axial direction so as to be able to adjust the telescopic position.

Figure 3:
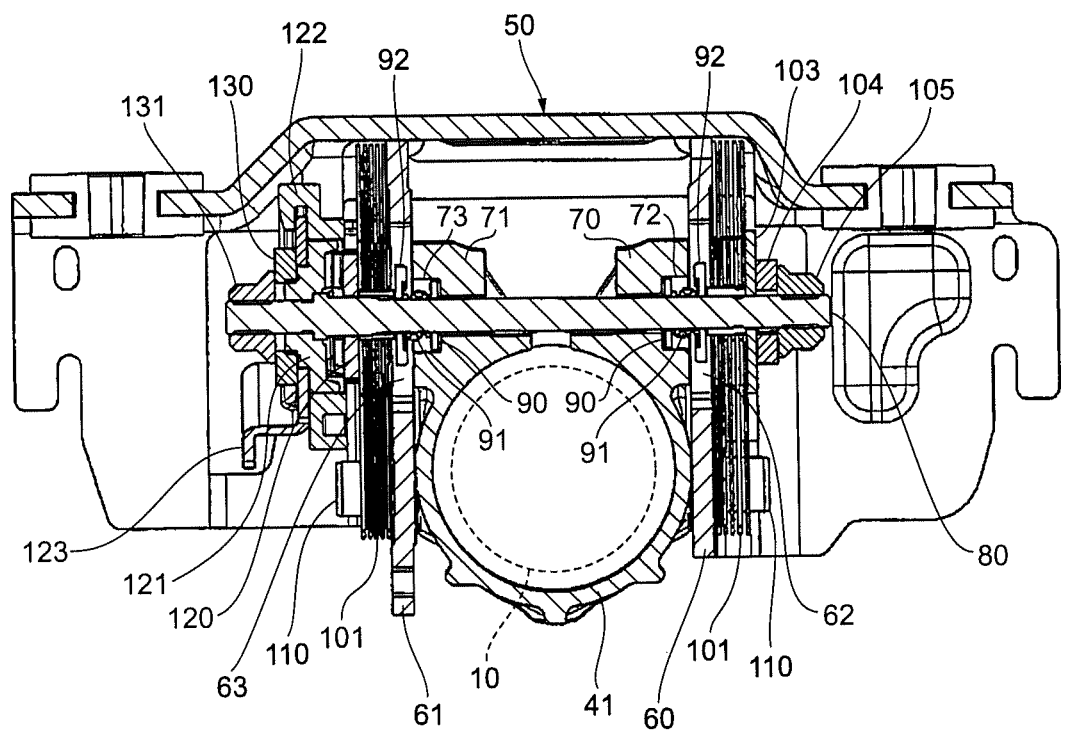
FIG. 3 is a longitudinal sectional explanatory view showing the column peripheral structure.
Figure 4:
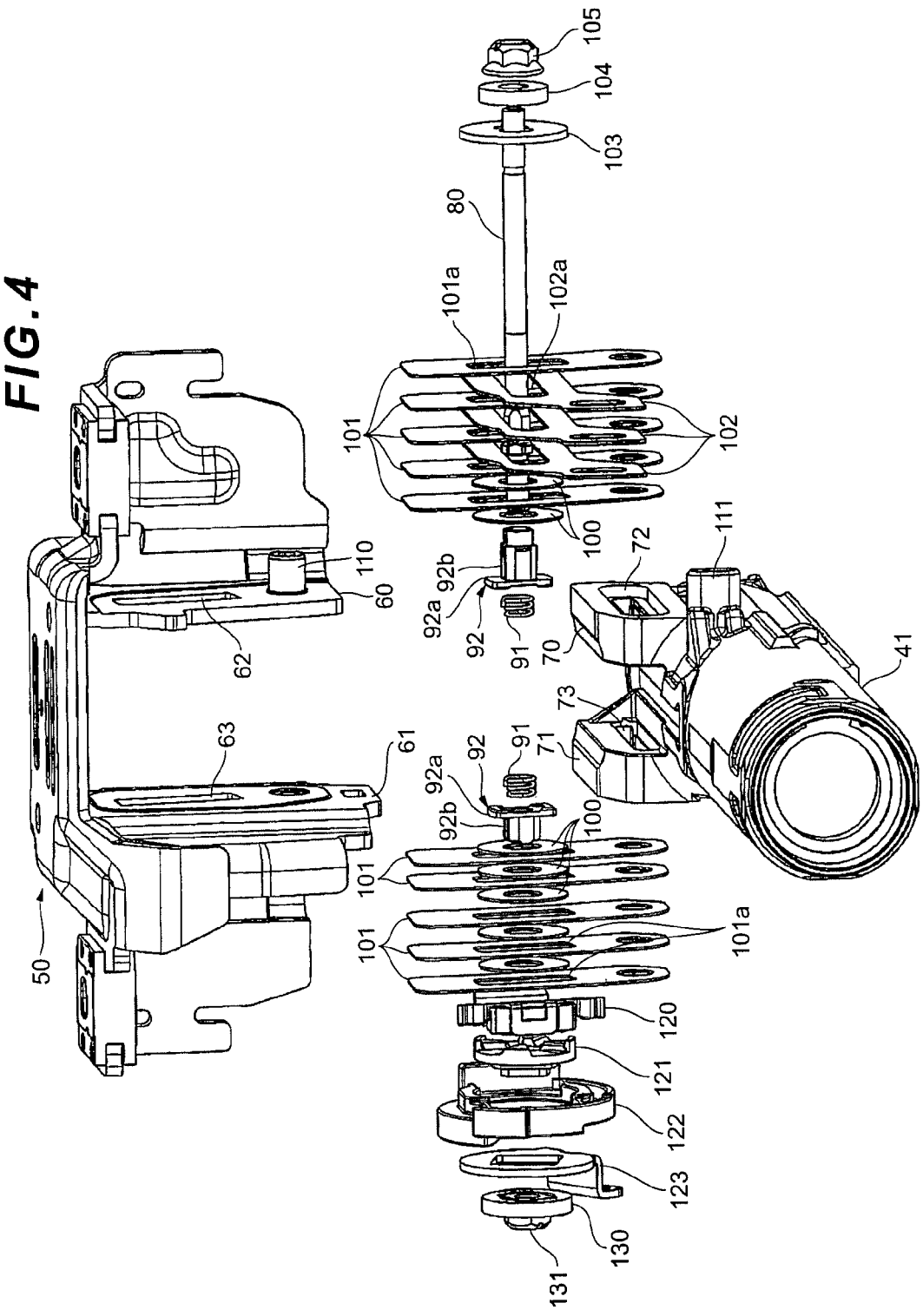
FIG. 4 is an exploded view of the column peripheral structure.

The upper column 41 is supported by a bracket 50 fixed to the vehicle body. As shown in FIGS. 3 and 4, for example, the bracket 50 includes a pair of side plates 60, 61 which grip the upper column 41 from both sides at the left and the right (vehicle width direction). The side plates 60, 61 are formed with vertically elongated long holes 62, 63 which horizontally penetrate through the side plates 60, 61, respectively.

The upper part of the upper column 41 is provided with a horizontal pair of upper plates 70, 71 which contact the inner side of the side plates 60, 61 of the bracket 50. The upper plates 70, 71 are formed with long holes 72, 73 elongated in a front/back direction, which horizontally penetrate through the upper plates 70, 71, respectively.

As shown in FIG. 3, a rod 80 horizontally penetrates through the long holes 62, 63 of the side plates 60, 61 of the bracket 50 and the long holes 72, 73 of the upper plates 70, 71 of the upper column 41, while gripping the upper column 41 between the side plate 60 and the side plate 61 of the bracket 50.

The outer sides at the left and right of the long holes 72, 73 of the upper column 41 have larger diameters than the diameters at the inner side, and a cylindrical collar 90 through which the rod 80 is inserted and a coil spring 91 are fitted in the enlarged diameter portions. The outer side of the coil spring 91 along the rod 80 is provided with an inner sleeve 92. As shown in FIG. 5, the inner sleeve 92 includes a flange part 92a with a large diameter and a tubular part 92b, and the flange part 92a contacts the coil spring 91.

As shown in FIG. 4, the outer side (right side in FIGS. 3 and 4) of the side plate 60 of the bracket 50 is provided, along the rod 80, with a plurality of annular thin plates 100, a plurality of tilting friction plates 101, a plurality of telescoping friction plates 102, a pressing plate 103, a thrust bearing 104 and a nut 105. The telescoping friction plate 102 is arranged, for example, between the tilting friction plates 101. Furthermore, the annular thin plate 100 is arranged between the tilting friction plates 101 and at the inner side of the innermost tilting friction plate 101.

The tilting friction plate 100 includes a vertically elongated long hole 101*a* and is clamped by a pin 110 provided at the side plate 60 of the bracket 50. The telescoping friction plate 102 includes a long hole 102*a* elongated in a front/back position and is clamped by a pin 111 provided at the upper column 41. As shown in FIG. 5B, the tubular part 92*b* of the inner sleeve 92 is inserted into the holes of the annular thin plates 100, the long holes 101*a* of the tilting friction plates 101 and the long holes 102*a* of the telescoping friction plates 102; and the outer end contacts the pressing plate 103.

As shown in FIG. 4, the outer side (left side in FIGS. 3 and 4) of the side plate 61 of the bracket 50 is provided, along the rod 80, with a plurality of annular thin plates 100, a plurality of tilting friction plates 101, a fixed cam 120, a movable cam 121, a sleeve 122, a pivot lever 123, a washer 130 and a nut 131. The annular thin plate 100 is arranged between the tilting friction plates 101 and at the inner side of the innermost tilting friction plate 101.

The tilting friction plate 101 is clamped by a pin 110 provided at the side plate 61 of the bracket 50. As shown in FIG. 5A, the tubular part 92*b* of the inner sleeve 92 is inserted into the holes of the annular thin plates 100 and the long holes 101*a* of the tilting friction plates 101; and the outer end contacts the fixed cam 120.

Figure 6:
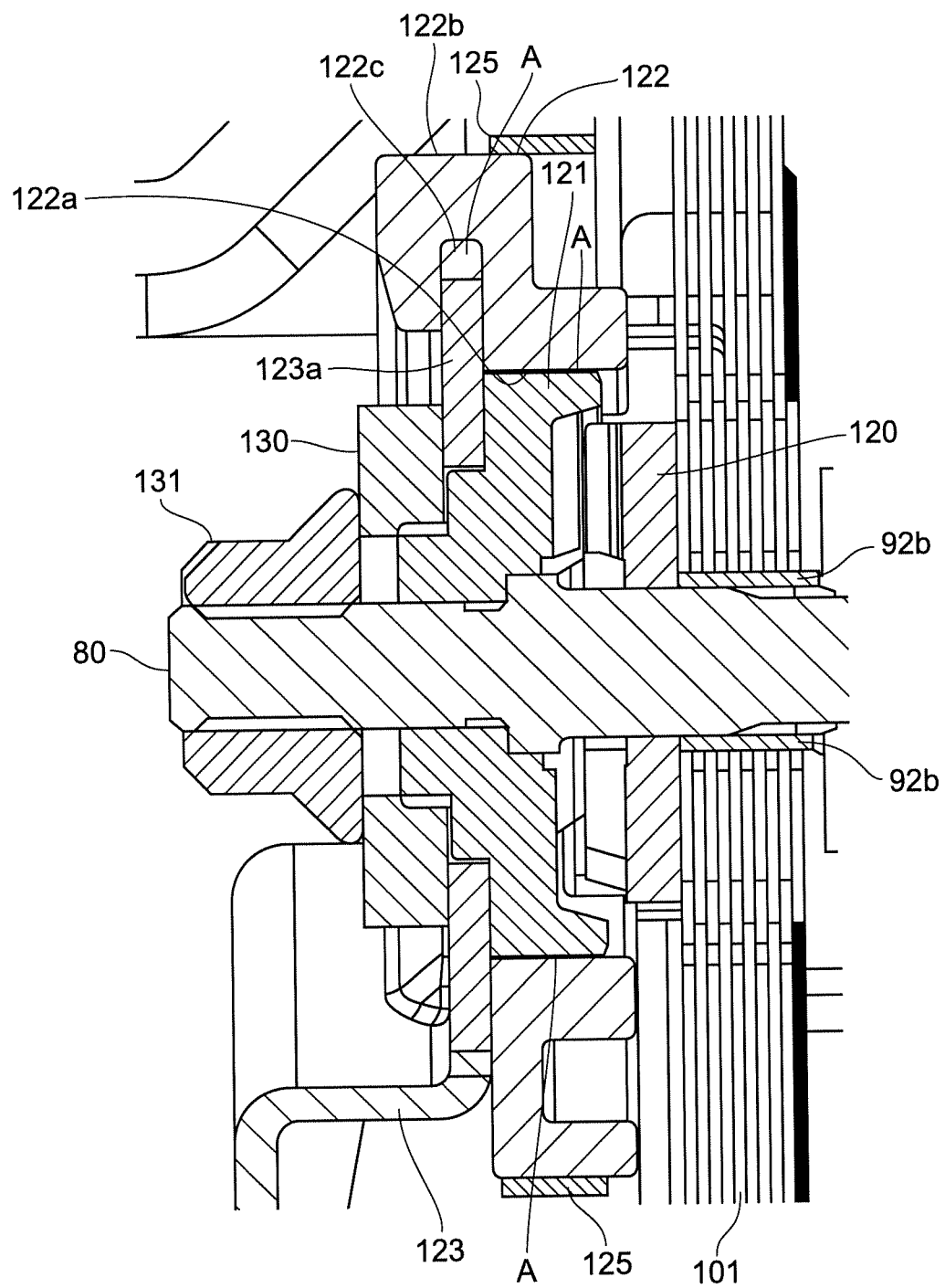
FIG. 6 is a longitudinal sectional explanatory view showing a cam peripheral structure.

As shown in FIG. 6, the fixed cam 120 engages with the movable cam 121 at a cam surface and the sleeve 122 holds the fixed cam 120 and the movable cam 121 from the outer periphery. The outer peripheral surface of the sleeve 122 is provided with a ring spring 125 as an annular pressing member. The pivot lever 123 is clamped at the movable cam 121 and is tightened by the washer 130 and the nut 131 from the outer side.

Figure 7:
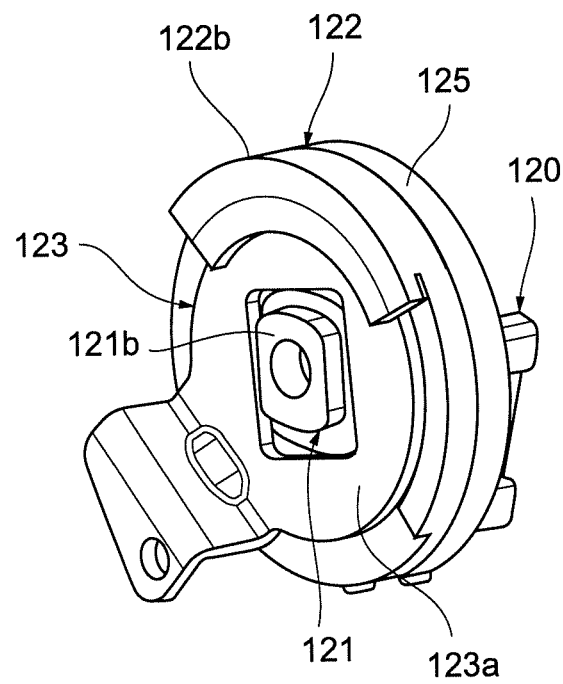
FIG. 7 is a perspective view showing an assembled state of the cam peripheral structure.
Figure 8:
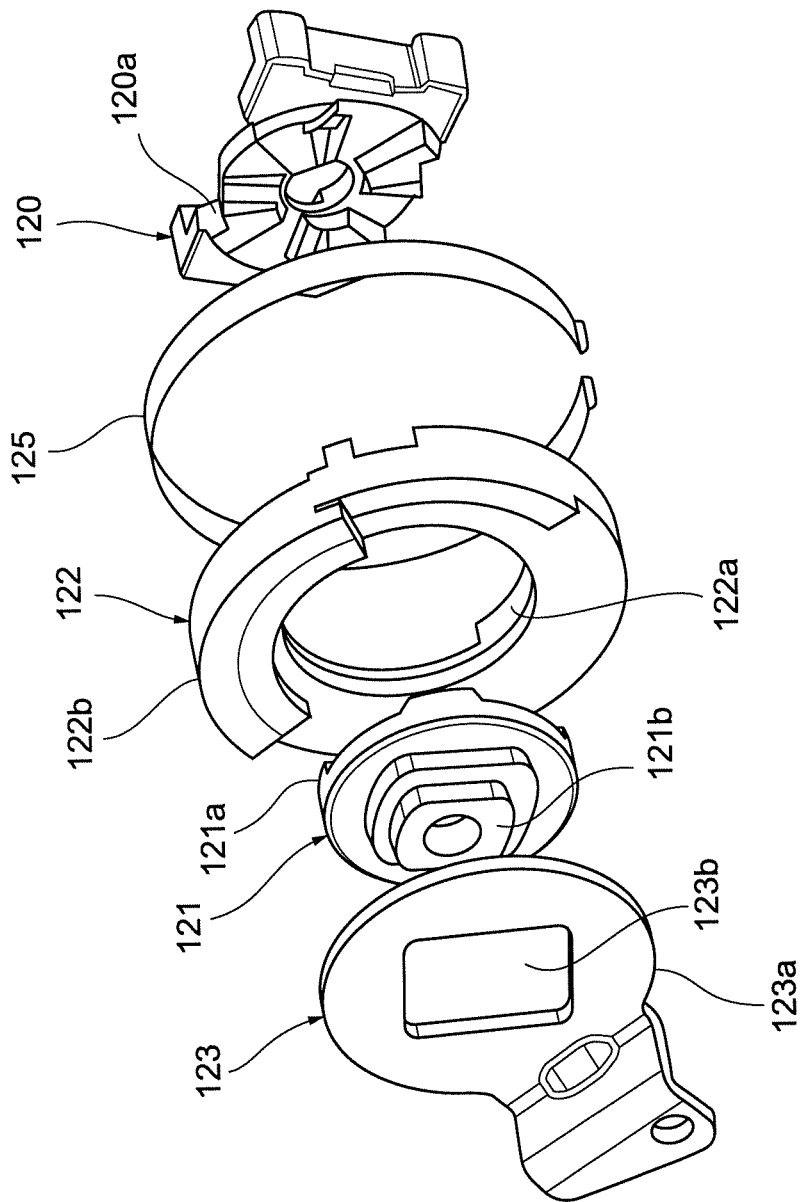
FIG. 8 is an exploded view of the cam peripheral structure.

The configurations of the fixed cam 120, the movable cam 121, the sleeve 122, the pivot lever 123 and the ring spring 125 will be described below in detail. FIG. 7 is an assembly drawing of these parts and FIG. 8 is an exploded view of these parts.

The fixed cam 120 is formed in a generally square shape and has a cam surface that is axially on the outer side of the rod 80 (surface that contacts the movable cam 121). The movable cam 121 is formed in a generally disk-shaped shape that has a circular outer peripheral surface and a cam surface at the inner side. The fixed cam 120 and the movable cam 121 have cam surfaces in which ridge parts and notch parts are alternately arranged in a circumferential direction. When the movable cam 121 rotates with respect to the fixed cam 120 and the ridge parts of both cams overlap, the fixed cam 120 is pushed towards the upper column 41 (inner side) along the rod 80. On the other hand, when the ridge parts and the notch parts of each of the movable cam 121 and the fixed cam 120 are engaged, the fixed cam 120 returns to the outer side along the rod 80.

The movable cam 121 has a rotation regulating part 121*a* that protrudes towards, for example, the fixed cam 120, and when the movable cam 121 rotates at a predetermined angle, the rotation regulating part 121*a* hits the stopper 120*a* of the fixed cam 120 and is able to control the rotation angle to within a predetermined range. This enables the movable cam 121 to rotate between the position where the ridge parts overlap and the position where the ridge part and the notch part overlap with respect to the fixed cam 120.

The surface of the movable cam 121 at the pivot lever 123 side is provided with, for example, a square-shaped protruding part 121*b*. The pivot lever 123 is formed into an elongated shape which can be easily held by the driver and has a disk-shaped part 123*a* at the tip end thereof. The center of the disk-shaped part 123*a* is formed with a square-shaped hole 123*b*. The protruding part 121*b* of the movable cam 121 is fitted in the hole 123*b* of the pivot lever 123, and the pivot lever 123 and the movable cam 121 turn integrally.

The sleeve 122 is formed in a generally ring-shaped shape. As shown in FIG. 6, the sleeve 122 has an inner wall part 122*a* which matches the outer diameter of the movable cam 121 and the inner wall part 122*a* slidably receives the movable cam 121. The outer peripheral surface of the movable cam 121 and the inner peripheral surface of the inner wall part 122*a* of the sleeve 122 are sliding surfaces and grease A is applied to the sliding surfaces. Examples of the grease A may include high-viscosity greases, preferably greases having a small temperature change in kinetic viscosity.

The ring spring 125 has a diameter that is slightly smaller than that of the outer peripheral surface of the sleeve 122. The ring spring 125 causes the sleeve 122 to be squeezed inwardly and thus be deformed. The sleeve 122 is pressed against the movable cam 121 at the inner side and thus increases the friction force which is generated at the sliding surfaces between the sleeve 122 and the movable cam 121.

The sleeve 122 is shaped such that it fits the fixed cam 120. The sleeve 122 is clamped at the fixed cam 120 in a rotational direction and is locked by the fixed cam 120 so as to be movable in an axial direction.

As shown in FIGS. 6 to 8, the sleeve 122 has, on the surface at the pivot lever 123 side, a sliding part 122*b* that slides, with the disk-shaped part 123*a* of the pivot lever 123 being fitted therein. The sliding part 122*b* protrudes from the outer periphery of the sleeve 122 towards the pivot lever 123 and includes a concave groove 122*c* on the inside, as shown in FIG. 6. The sliding part 122*b* and the groove 122*c* are formed in an arc-shape along a circumferential direction of the sleeve 122. The disk-shaped part 123*a* of the pivot lever 123 is rotatably fitted in the groove 122*c*, and the groove 122*c* is applied with the grease A.

The pivot lever 123 is tightened with respect to the sleeve 122 and the movable cam 121 by the washer 130 and the nut 131.

Next, an operation of a mechanism for adjusting a tilt position and a telescopic position of the steering wheel H configured as set forth above will be described below. When the pivot lever 123 is turned towards the clamped position (lock) (e.g., upward), the movable cam 121 rotates with respect to the fixed cam 120 and the ridge parts of both cam surfaces overlap, and thereby the fixed cam 120 moves along the rod 80 towards the upper column 41 (inner side). When the fixed cam 120 is moved to the inner side, as shown in FIG. 5A, the fixed cam 120 pushes the tilting friction plate 101, etc. towards the inner side and the side plate 61 of the bracket 50 is thus elastically deformed towards the inner side.

Furthermore, when the fixed cam 120 is moved to the inner side, the rod 80 is pulled towards the pivot lever 123 and the pressing plate 103 moves towards the upper column 41 (inner side). As shown in FIG. 5B, this enables the pressing plate 103 to push the tilting friction plate 101, etc. towards the inner side and the side plate 60 of the bracket 50 is thus elastically deformed towards the inner side.

As a result, the upper column 41 is strongly gripped by the side plates 60, 61 at both sides of the bracket 50 and the position of the steering wheel H is fixed.

On the other hand, when the pivot lever 123 is moved towards the unclamped position (unlock) (e.g., downward), the movable cam 121 rotates with respect to the fixed cam 120 and the ridge part and the notch part of each of the cam surfaces overlap, and thereby the biasing force of the coil spring 91 causes the fixed cam 120 to be moved towards the pivot lever 123 (outer side). When the fixed cam 120 is moved to the outer side, the tilting friction plate 101, etc. which had been pushed by the fixed cam 120 returns to its original position at the outer side, and the side plate 61 of the bracket 50 which had been elastically deformed towards the inner side also returns to its original position.

Furthermore, when the fixed cam 120 is moved to the outer side, the rod 80 moves to the opposite side of the pivot lever 123. This enables the pressing plate 103 which had been pushing the tilting friction plate 101, etc. to return to its original position at the outer side, and the side plate 60 of the bracket 50 which had been elastically deformed towards the inner side also returns to its original position.

As a result, the upper column 41 is released from being gripped by the side plates 60, 61 of the bracket 50 and is therefore able to move.

When a vertical force is applied to the steering wheel H while the upper column 41 is released from being gripped by the bracket 50, the upper column 41 moves vertically along the long holes 62, 63 of the side plates 60, 61 of the bracket 50, thereby enabling the tilt position of the steering wheel H to be adjusted.

When a front/back force is applied to the steering wheel H, the upper column 41 moves frontwards and backwards along the long holes 72, 73 of the upper plates 70, 71 of the upper column 41, thereby enabling the telescopic position of the steering wheel H to be adjusted.

According to the present embodiment, when the pivot lever 123 is turned to adjust the position of the steering wheel H, the movable cam 121 slides against the sleeve 122. Since the ring spring 125 holds the outer peripheral surface of the sleeve 122 and presses the sleeve 122 against the movable cam 121, the friction force of the sliding surfaces between the movable cam 121 and the sleeve 122 is increased. As a result, rattles and rattling sounds which are generated around the cam when the position of the steering wheel H is adjusted are easily and sufficiently reduced. In other words, the ring spring 125 serves as a rattle mitigating member which mitigates the rattles and the rattling sounds which are generated around the cam when the position of the steering wheel H is adjusted. Moreover, since the ring spring 125 acts on the sleeve 122, the movement of the pivot lever 123 is not affected and the operability of the pivot lever 123 can be sufficiently ensured.

Since the grease A is applied to the sliding surfaces between the sleeve 122 and the movable cam 121, the grease A can also be used to reduce the rattles and rattling sounds which are generated when the position of the steering wheel H is adjusted.

The ring spring 125 used as a pressing member is flexible and can be easily assembled with the sleeve 122 and easily be replaced. Furthermore, since the spring ring 125 can also flexibly adjust to the expansion and contraction of the sleeve 122, it can also be appropriately used, for example, in an environment where temperature change is large.

Since an arc-shaped groove 122*c* is formed in the sleeve 122 and an outer peripheral part of the disk-shaped part 123*a* of the pivot lever 123 is fitted in the groove 122*c* to form a sliding part, rattles and rattling sounds can be reduced. Furthermore, since the grease A is applied to the sliding part, rattles and rattling sounds can be further reduced. For example, the pivot lever 123 may vigorously move when the lock is released, but the grease A serves as a damper and the acceleration of the pivot lever 123 can be suppressed. This prevents the pivot lever 123 from severely hitting the driver and the sound from being generated by the movement of the pivot lever 123.

Figure 9:
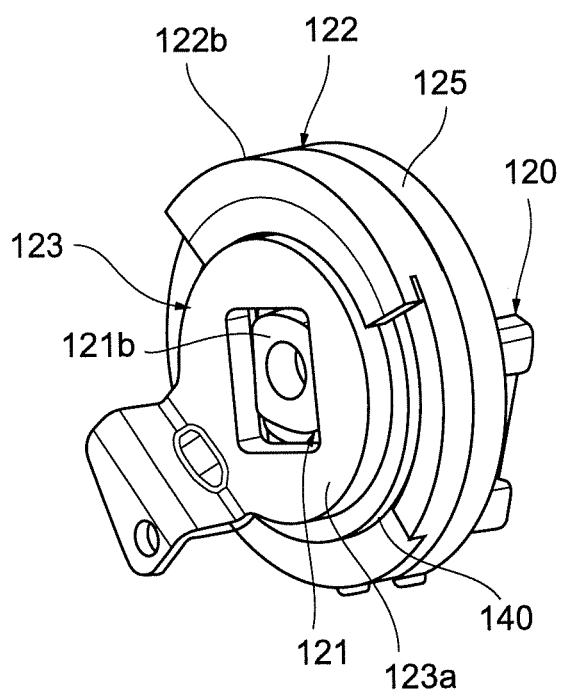
FIG. 9 is a perspective view showing an assembled state of the cam peripheral structure having an intervening member.
Figure 10:
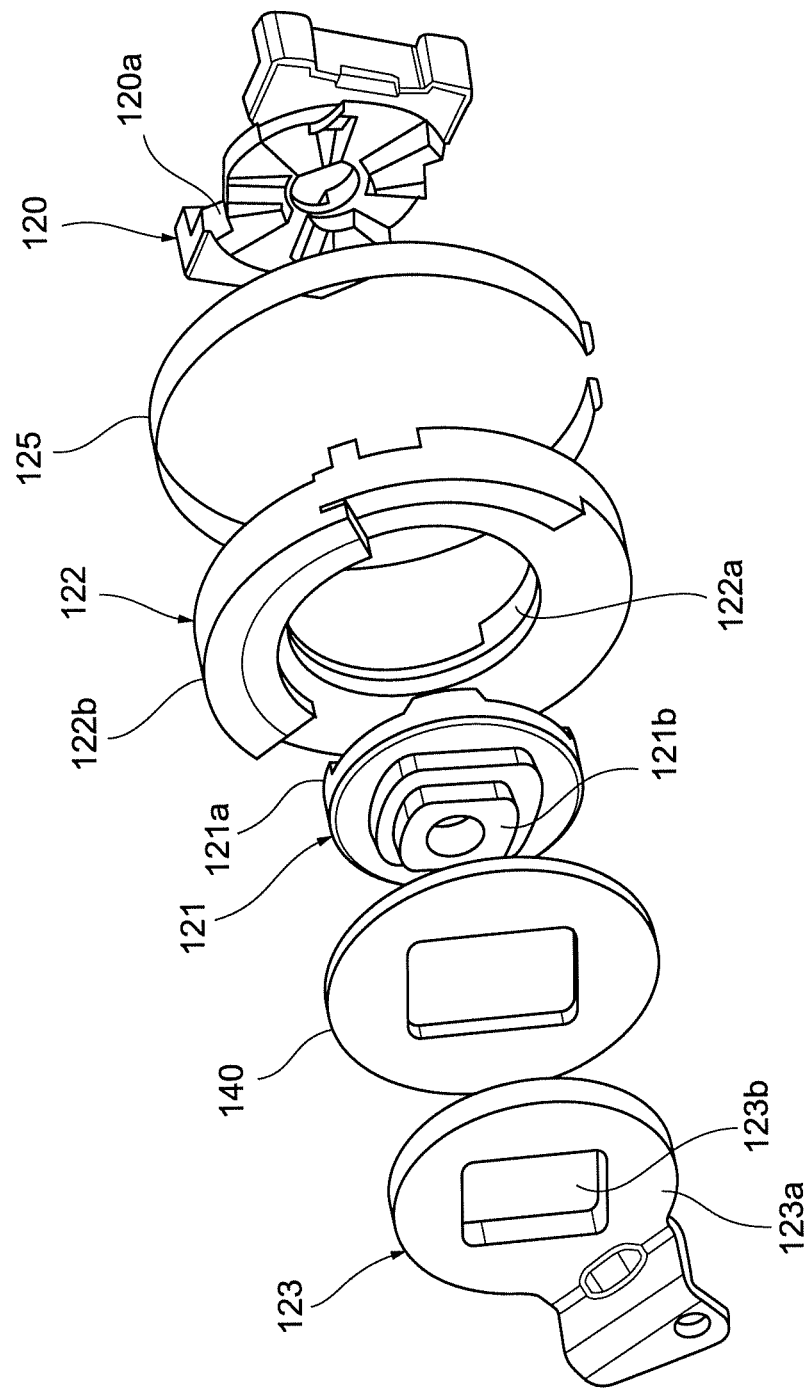
FIG. 10 is an exploded view of the cam peripheral structure in FIG. 9.

In the above-mentioned embodiment, as shown in FIGS. 9 and 10, a disk-shaped intervening member 140 may be intervened between the pivot lever 123 and the sleeve 122. In this case, a hole 140*a* is formed in the center of the intervening member 140 and a protruding part 121*b* of the movable cam 121 may be fitted in the hole 140*a*. The intervening member 140 is fitted in the arc-shaped groove 122*c* of the sleeve 122 to form a sliding part. This sliding part causes the rattles and the rattling sounds to be reduced. Furthermore, the grease A may be intervened between the groove 122*c* and the intervening member 140, and in this case, the rattles and the rattling sounds may be further reduced. The operability of the pivot lever 123 can also be sufficiently ensured.

Although preferred embodiments of the present invention have been described above with reference to the attached drawings, the present invention is not limited thereto. As will be appreciated by those skilled in the art, various changes or modifications may be made within the scope of the claims and it will be appreciated that such changes or modifications fall within the technical scope of the invention.

For example, the configuration of the mechanism for adjusting the tilt position and the telescopic position of the steering wheel H in the above-mentioned embodiment is not limited thereto, and the present invention can also be applied to those having other known telescopic structure configurations. For example, the pivot lever 123 may have other configurations, as long as it turns the column with respect to the vehicle body in order to clamp and unclamp the column. The configuration of the cams 120, 121 may have other configurations, as long as it clamps and unclamps the column by changing the rotation of the pivot lever 123 into an axial movement of said rotation.

The sleeve 122 may have other configurations, as long as it holds the cam 120 or the cam 121 and slides against the cam 120 or the cam 121 when the pivot lever 123 is turned. In such a configuration, the ring spring 125 may be configured such that the sleeve 122 is pressed against the sliding surfaces of the cams 120, 121. The sleeve 122 may be provided with a slit, etc. so as to be easily deformed by the ring spring 125.

The pressing member is not limited to being the spring ring 125 and may be an elastic member with other shapes and materials. The pressing member does not have to be an elastic member and may have other configurations, as long as the sleeve can be pressed against the sliding surface of the cam. The pressing member may be, for example, a threaded ring with a reducible diameter. In the above-mentioned embodiment, the pressing member and the sleeve were separate entities but they may also be integrated. In such configuration, the pressing member and the sleeve may be integrally molded.

Furthermore, the grease A may not be applied to the sliding surfaces between the sleeve 122 and the cams 120, 121, and even if applied, the grease A may have low viscosity. Similarly, the grease A may not be applied between the groove 122*c* of the sleeve 122 and the pivot lever 123 or the intervening member 140, and even if applied, the grease A may have low viscosity. In addition, the grease A applied to the groove 122c may be the same as the grease A applied to the inner peripheral surface (i.e., sliding surface) of the inner wall part 122a of the sleeve 122 described above. It is obvious that the grease A applied to the groove 122c may be different from the grease A applied to the sliding surface of the inner wall part 122a.

The steering apparatus 1 does not have to be able to adjust both the tilt position and the telescopic position but may instead adjust either one of such positions. The present invention may also be applied when positions of the steering wheel other than the tilt position and the telescopic position are to be adjusted. Moreover, the clamp position may be lower, or the lower column and the upper column may be switched.

B. Second Embodiment

The steering apparatus 1 according to the second embodiment has a feature wherein a spring clip 125' is provided instead of the ring spring 125 according to the first embodiment. Therefore, illustration for the drawings in common with the steering apparatus 1 according to the first embodiment (FIGS. 1-5) has been omitted, and the same reference numerals have been provided to the corresponding portions and the detailed description thereof has been omitted.

Figure 11:
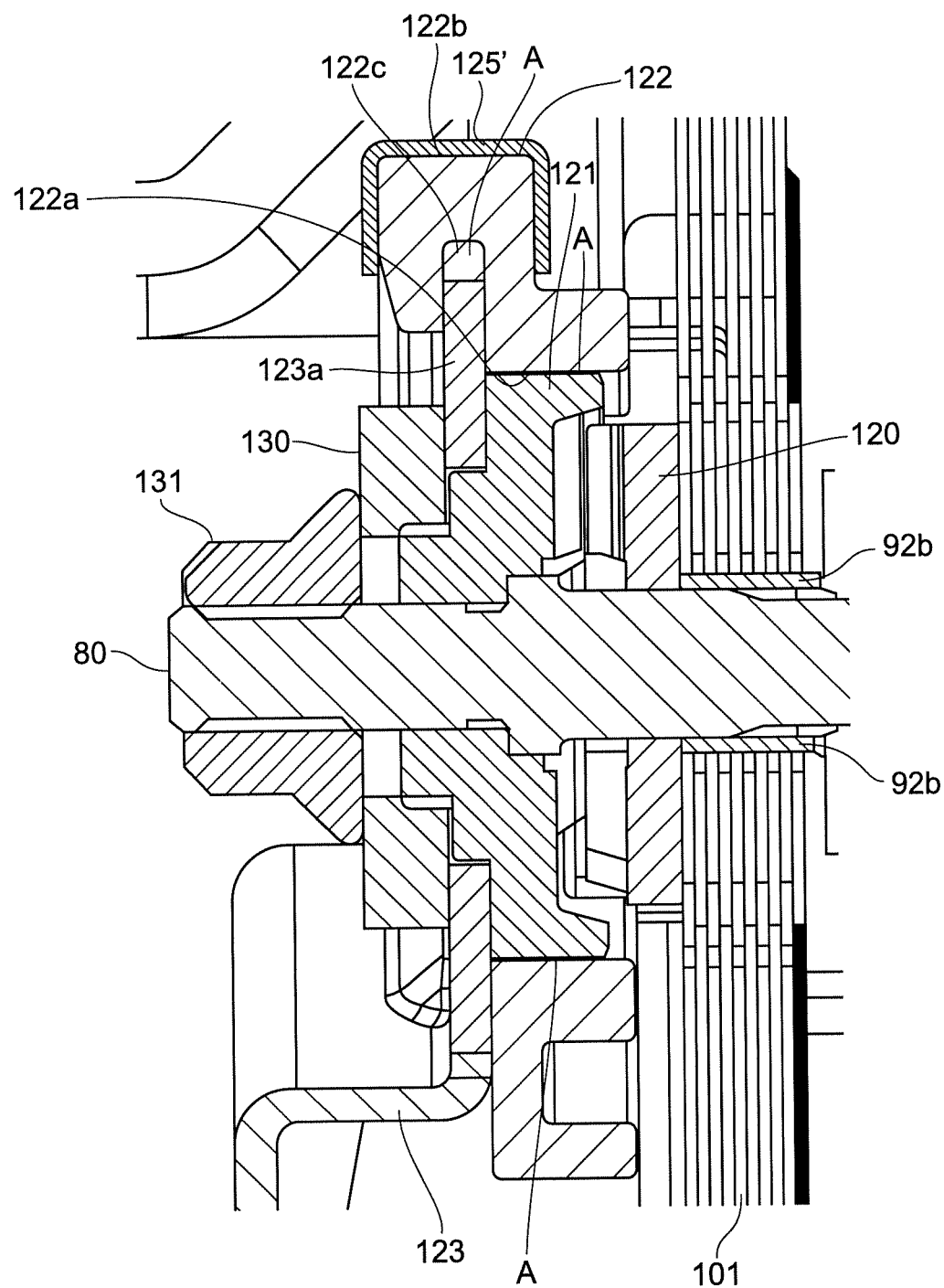
FIG. 11 is a longitudinal sectional explanatory view showing the cam peripheral structure.

As shown in FIG. 11, the fixed cam 120 engages with the movable cam 121 at a cam surface and the sleeve 122 holds the fixed cam 120 and the movable cam 121 from the outer periphery. The outer peripheral part of the sleeve 122 is provided with a spring clip 125' as a gripping member. The pivot lever 123 is clamped at the movable cam 121 and is tightened by the washer 130 and the nut 131 from the outer side.

Figure 12:
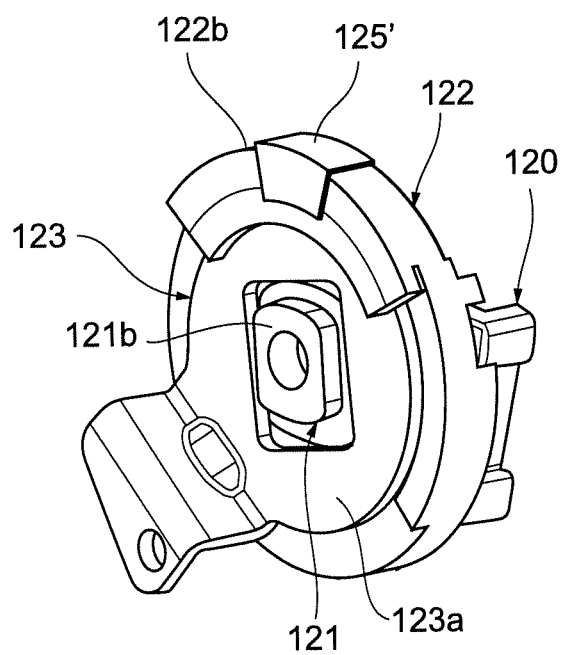
FIG. 12 is a perspective view showing an assembled state of the cam peripheral structure.
Figure 13:
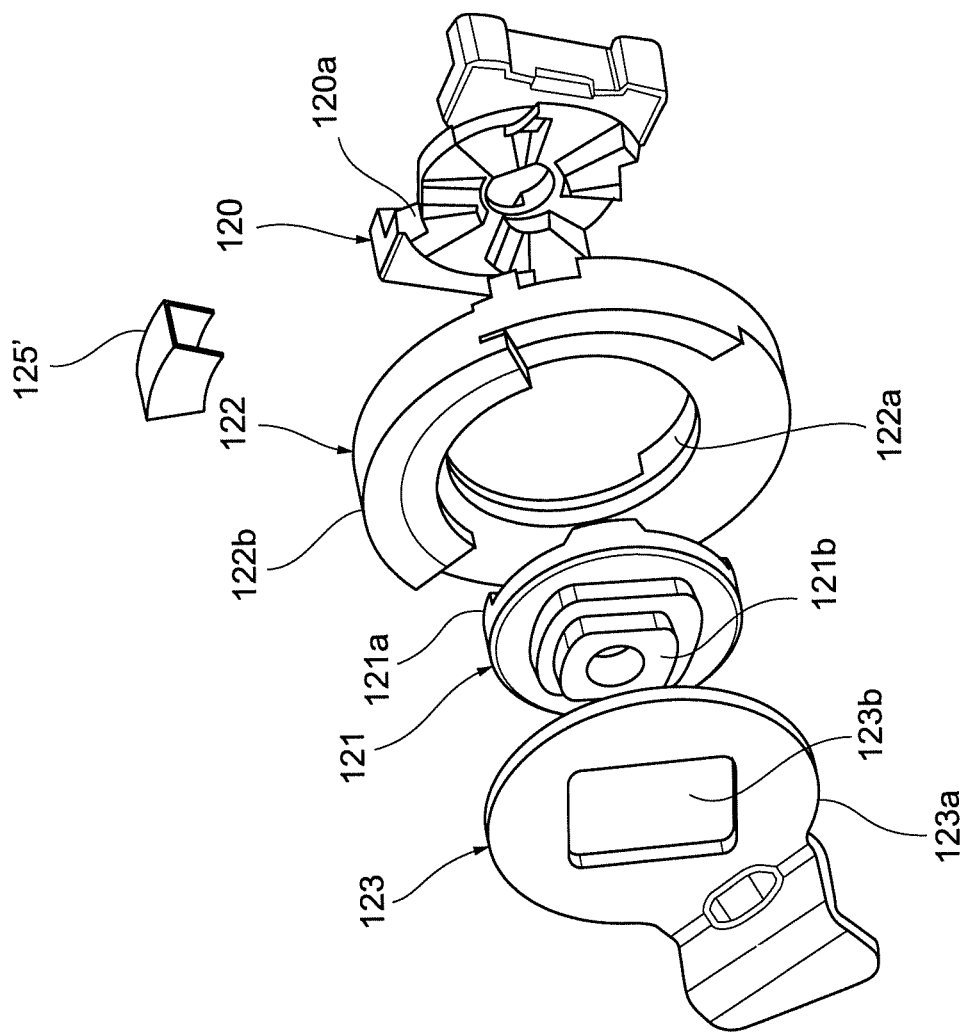
FIG. 13 is an exploded view of the cam peripheral structure.

The configurations of the fixed cam 120, the movable cam 121, the sleeve 122, the pivot lever 123 and the ring clip 125' will be described below in detail. FIG. 12 is an assembly drawing of these parts and FIG. 13 is an exploded view of these parts.

The fixed cam 120 is formed in a generally square shape and has a cam surface that is axially on the outer side of the rod 80 (surface that contacts the movable cam 121). The movable cam 121 is formed in a generally disk-shaped shape that has a circular outer peripheral surface and a cam surface at the inner side. The fixed cam 120 and the movable cam 121 have cam surfaces in which ridge parts and notch parts are alternately arranged in a circumferential direction. When the movable cam 121 rotates with respect to the fixed cam 120 and the ridge parts of both cams overlap, the fixed cam 120 is pushed towards the upper column 41 (inner side) along the rod 80. On the other hand, when the ridge parts and the notch parts of each of the movable cam 121 and the fixed cam 120 are engaged, the fixed cam 120 returns to the outer side along the rod 80.

The movable cam 121 has a rotation regulating part 121a that protrudes towards, for example, the fixed cam 120, and when the movable cam 121 rotates at a predetermined angle, the rotation regulating part 121a hits the stopper 120a of the fixed cam 120 and is able to control the rotation angle to within a predetermined range. This enables the movable cam 121 to rotate between the position where the ridge parts overlap and the position where the ridge part and the notch part overlap with respect to the fixed cam 120.

The surface of the movable cam 121 at the pivot lever 123 side is provided with, for example, a square-shaped protruding part 121b. The pivot lever 123 is formed into an elongated shape which can be easily held by the driver and has a disk-shaped part 123a at the tip end. The center of the disk-shaped part 123a is formed with a square-shaped hole 123b. The protruding part 121b of the movable cam 121 is fitted in the hole 123b of the pivot lever 123, and the pivot lever 123 and the movable cam 121 turn integrally.

The sleeve 122 is formed in a generally ring-shaped shape. As shown in FIG. 11, the sleeve 122 has an inner wall part 122a which matches the outer diameter of the movable cam 121 and the inner wall part 122a slidably receives the movable cam 121. The outer peripheral surface of the movable cam 121 and the inner peripheral surface of the inner wall part 122a of the sleeve 122 are sliding surfaces and grease A is applied to the sliding surfaces. Examples of the grease A may include high-viscosity greases, preferably greases having a small temperature change in kinetic viscosity.

As shown in FIGS. 11 to 13, the sleeve 122 has, on the surface at the pivot lever 123 side, a sliding part 122b that slides, with the disk-shaped part 123a of the pivot lever 123 being fitted therein. The sliding part 122b protrudes from the outer periphery of the sleeve 122 towards the pivot lever 123 and includes a concave groove 122c on the inside, as shown in FIG. 11. The sliding part 122b and the groove 122c are formed in an arc-shape along a circumferential direction of the sleeve 122. The disk-shaped part 123a of the pivot lever 123 is rotatably fitted in the groove 122c, and the groove 122c is applied with the grease A.

The spring clip 125' pinches the sliding part 122b from the outer side. The spring clip 125' has a shorter circumferential length than that of the sliding part 122b. The spring clip 125' causes the sliding part 122b of the sleeve 122 to be pressed inwardly and thus be deformed. The sliding part 122b is pressed against the disk-shaped part 123a at the inner side and thus increases the friction force which is generated between the disk-shaped part 123a and the sliding part 122b.

The sleeve 122 is shaped such that it fits the fixed cam 120. The sleeve 122 is clamped at the fixed cam 120 in a rotational direction and is locked by the fixed cam 120 so as to be movable in an axial direction.

The pivot lever 123 is tightened with respect to the sleeve 122 and the movable cam 121 by the washer 130 and the nut 131.

The operation of a mechanism for adjusting a tilt position and a telescopic position of the steering wheel H configured as set forth above can be explained as being similar to the above-mentioned first embodiment and will therefore be omitted.

According to the present embodiment, when the pivot lever 123 is turned to adjust the position of the steering wheel H, the disk-shaped part 123a of the pivot lever 123 slides against the sliding part 122b of the sleeve 122. Since the spring clip 125' grips the sliding part 122b from the outer side, the friction force between the pivot lever 123 and the sleeve 122 is increased. As a result, rattles and rattling sounds which are generated around the cam when the position of the steering wheel H is adjusted are easily and sufficiently reduced. In other words, the spring clip 125' serves as a rattle mitigating member which mitigates the rattles and the rattling sounds which are generated around the cam when the position of the steering wheel H is adjusted. Moreover, since the spring clip 125' acts on the sleeve 122, the movement of the pivot lever 123 is not affected and the operability of the pivot lever 123 can be sufficiently ensured.

Since grease A is applied to the sliding part 122b, the grease A can also be used to reduce the rattles and rattling sounds which are generated when the position of the steering wheel H is adjusted. The grease A does not necessarily have to be applied. For example, the pivot lever 123 may vigorously move when the lock is released, but the grease A serves as a damper and the acceleration of the pivot lever 123 can be suppressed. This prevents the pivot lever 123 from severely hitting the driver and prevents sound from being generated by the movement of the pivot lever 123.

The spring clip 125' used as a gripping member is flexible and can be easily assembled with the sliding part 122b of the sleeve 122 and easily be replaced. Furthermore, since the spring clip 125' can also flexibly adjust to the expansion and contraction of the sleeve 122, it can also be appropriately used, for example, in an environment where temperature change is large.

Figure 14:
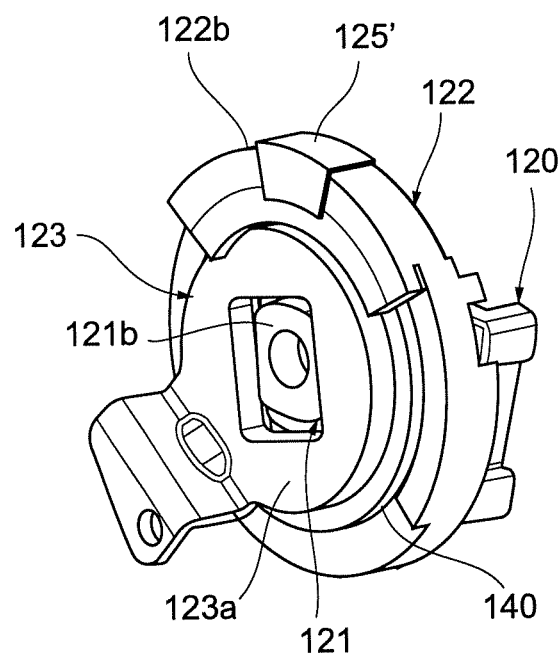
FIG. 14 is a perspective view showing an assembled state of the cam peripheral structure having an intervening member.
Figure 15:
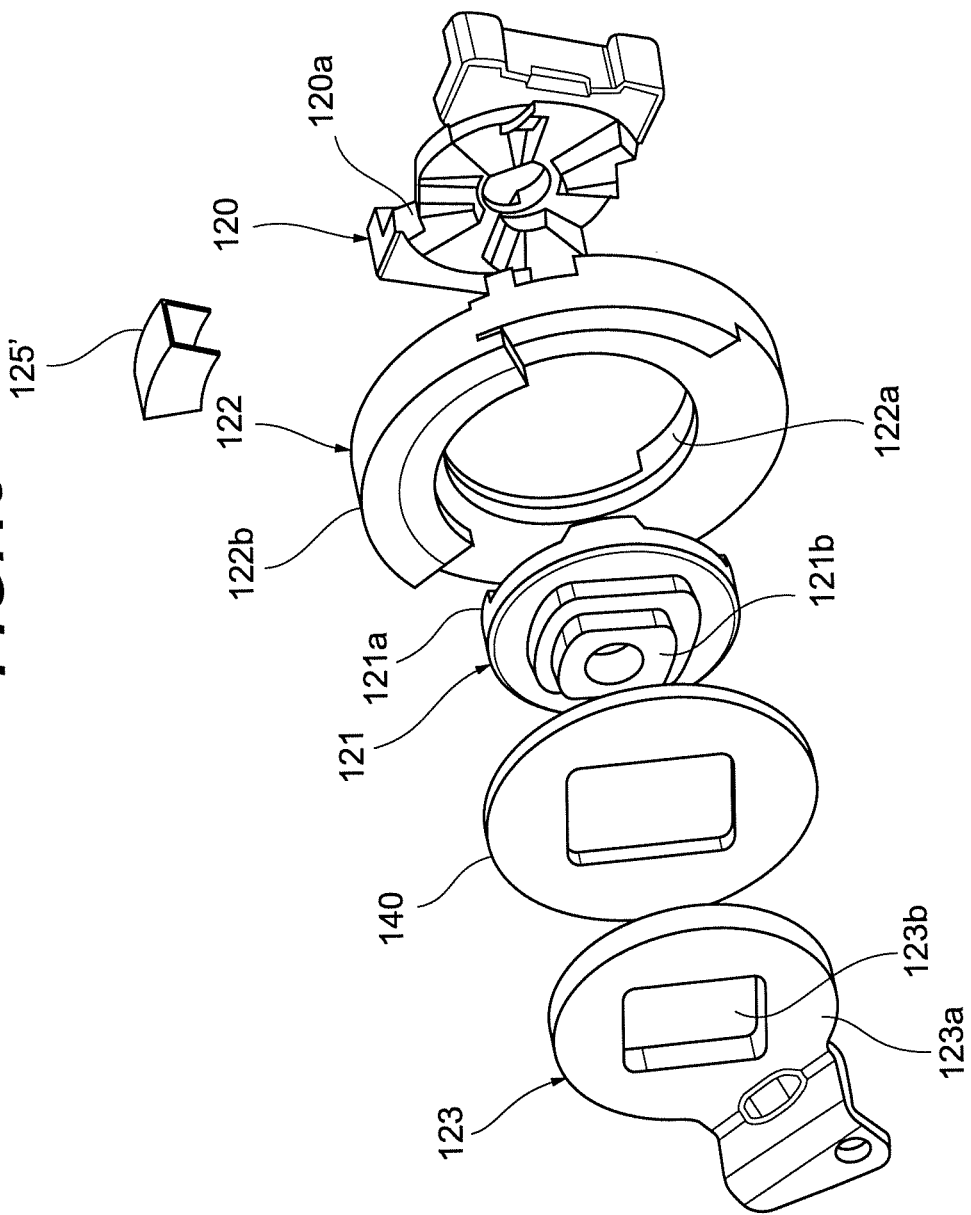
FIG. 15 is an exploded view of the cam peripheral structure in FIG. 14.

In the above-mentioned embodiment, as shown in FIGS. 14 and 15, a disk-shaped intervening member 140 may be intervened between the pivot lever 123 and the sleeve 122. In this case, a hole 140a is formed in the center of the intervening member 140 and a protruding part 121b of the movable cam 121 may be fitted in the hole 140a. The intervening member 140 is fitted in the groove 122c of the sliding part 122b of the sleeve 122. The spring clip 125' is attached to this sliding part 122b, and rattles and rattling sounds which are generated when the position of the steering wheel H is adjusted can be reduced. Furthermore, the grease A may be intervened between the groove 122c and the intervening member 140, and in this case, the rattles and the rattling sounds may be further reduced. The operability of the pivot lever 123 can also be sufficiently ensured.

Although preferred embodiments of the present invention have been described above with reference to the attached drawings, the present invention is not limited thereto. As will be appreciated by those skilled in the art, various changes or modifications may be made within the scope of the claims and it will be appreciated that such changes or modifications fall within the technical scope of the invention.

For example, the configuration of the mechanism for adjusting the tilt position and the telescopic position of the steering wheel H in the above-mentioned embodiment is not limited thereto, and the present invention can be applied also to those having other known telescopic structure configurations. For example, the pivot lever 123 may have other configurations, as long as it turns the column with respect to the vehicle body in order to clamp and unclamp the column. The configuration of the cams 120, 121 may have other configurations, as long as it clamps and unclamps the column by changing the rotation of the pivot lever 123 into an axial movement of said rotation.

The sleeve 122 may have other configurations, as long as it holds the cam 120 or the cam 121 and slides against the cam 120 or the cam 121 when the pivot lever 123 is turned. The configuration of the sliding part 122b of the sleeve 122 is also not limited thereto. The sliding part 122b may be provided with a slit, etc. so as to be easily deformed by the spring clip 125'.

The gripping member is not limited to the spring clip 125' and may be an elastic member with other shapes and materials. The gripping member does not have to be an elastic member and may have other configurations, as long as the sliding part 122b can be held from the outer side and the friction force between the pivot lever 123 or the intervening member 140 and the sliding part 122b is increased. The gripping member may be, for example, a clip with a holding function, such as a screw. In the above-mentioned embodiment, the gripping member and the sleeve were separate entities but they may also be integrated. In such configuration, the gripping member and the sleeve may be integrally molded.

Furthermore, the grease A may not be applied to the sliding surfaces between the sleeve 122 and the cams 120, 121, and even if applied, the grease A may have low viscosity. Similarly, the grease A may not be applied between the sliding part 122b of the sleeve 122 and the pivot lever 123 or the intervening member 140, and even if applied, the grease A may have low viscosity. In addition, the grease A applied to the groove 122c may be the same as the grease A applied to the inner peripheral surface (i.e., sliding surface) of the inner wall part 122a of the sleeve 122 described above. It is obvious that the grease A applied to the groove 122c may be different from the grease A applied to the sliding surface of the inner wall part 122a.

The steering apparatus 1 does not have to be able to adjust both the tilt position and the telescopic position but may instead adjust either one of such positions. The present invention may also be applied when positions of the steering wheel other than the tilt position and the telescopic position are to be adjusted. Moreover, the clamp position may be lower, or the lower column and the upper column may be switched.

DESCRIPTION OF REFERENCE NUMERALS 1 steering apparatus
10 rotational axis
20 column
40 lower column
41 upper column
50 bracket
80 rod
120 fixed cam
121 movable cam
122 sleeve
123 pivot lever
125 ring spring
125' spring clip
A grease
H steering wheel

What is claimed is:

1. A steering apparatus that is capable of adjusting a position of a steering wheel by moving a column that holds a shaft of the steering wheel with respect to a vehicle body, the steering apparatus comprising:
    a pivot lever for clamping and unclamping the column with respect to the vehicle body;
    a cam that clamps and unclamps the column by changing a turn of the pivot lever into an axial movement of said turn;
    a sleeve that holds the cam and slides against the cam when the pivot lever is turned; and
    a rattle mitigating member that increases at least any one of friction forces from among a friction force generated between the sleeve and a sliding surface of the cam or a friction force generated between the sleeve and the pivot lever.

2. A steering apparatus that is capable of adjusting a position of a steering wheel by moving a column that holds a shaft of the steering wheel with respect to a vehicle body, the steering apparatus comprising:
    a pivot lever for clamping and unclamping the column with respect to the vehicle body;

a cam that clamps and unclamps the column by changing a turn of the pivot lever into an axial movement of said turn;

a sleeve that holds the cam and slides against the cam when the pivot lever is turned; and a pressing member that presses the sleeve against a sliding surface of the cam.

3. The steering apparatus according to claim 2, wherein the cam includes a movable cam that rotates together with the pivot lever and a fixed cam that moves in the axial direction due to a rotation of the movable cam, wherein the sleeve slides against the movable cam, and wherein the pressing member presses the sleeve against the sliding surface of the movable cam.

4. The steering apparatus according to claim 3, wherein the sleeve is formed in an annular shape that receives the movable cam at an inner side, and wherein the pressing member is attached to an outer peripheral surface of the sleeve.

5. The steering apparatus according to any one of claims 2 to 4, wherein grease is applied to the sliding surface between the sleeve and the cam.

6. The steering apparatus according to any one of claims 2 to 4, wherein the sleeve is provided with a sliding part that slides against the pivot lever or an intervening member intervened between the pivot lever and the sleeve.

7. The steering apparatus according to claim 6, wherein the pivot lever or the intervening member has a disk-shaped part, and wherein the sliding part has an arc-shaped groove in which the disk-shaped part is fitted therein.

8. The steering apparatus according to claim 6, wherein grease is applied to the sliding part.

9. The steering apparatus according to any one of claims 2 to 4, wherein the pressing member is an elastic member.

10. A steering apparatus that is capable of adjusting a position of a steering wheel by moving a column that holds a shaft of the steering wheel with respect to a vehicle body, the steering apparatus comprising:

a pivot lever for clamping and unclamping the column with respect to the vehicle body;

a cam that clamps and unclamps the column by changing a turn of the pivot lever into an axial movement of said turn; and a sleeve that holds the cam and slides against the cam when the pivot lever is turned, wherein the sleeve includes a sliding part that slides while a part of the pivot lever or an intervening member intervened between the pivot lever and the sleeve is fitted therein, and wherein the sliding part is attached with a gripping member that increases a friction force between the sliding part and the pivot lever or the intervening member by pinching the sliding part from the outer side.

11. The steering apparatus according to claim 10, wherein the pivot lever or the intervening member has a disk-shaped part, and wherein the sliding part is formed in an arc shape along a circumferential direction of the disk-shaped part.

12. The steering apparatus according to claim 10 or 11, wherein grease is applied to the sliding part.

13. The steering apparatus according to claim 10 or 11, wherein the gripping member is an elastic member.

* * * * *